Oct. 18, 1966     P. D. BARLOW     3,279,252
LEVEL SENSING APPARATUS
Filed Sept. 18, 1963
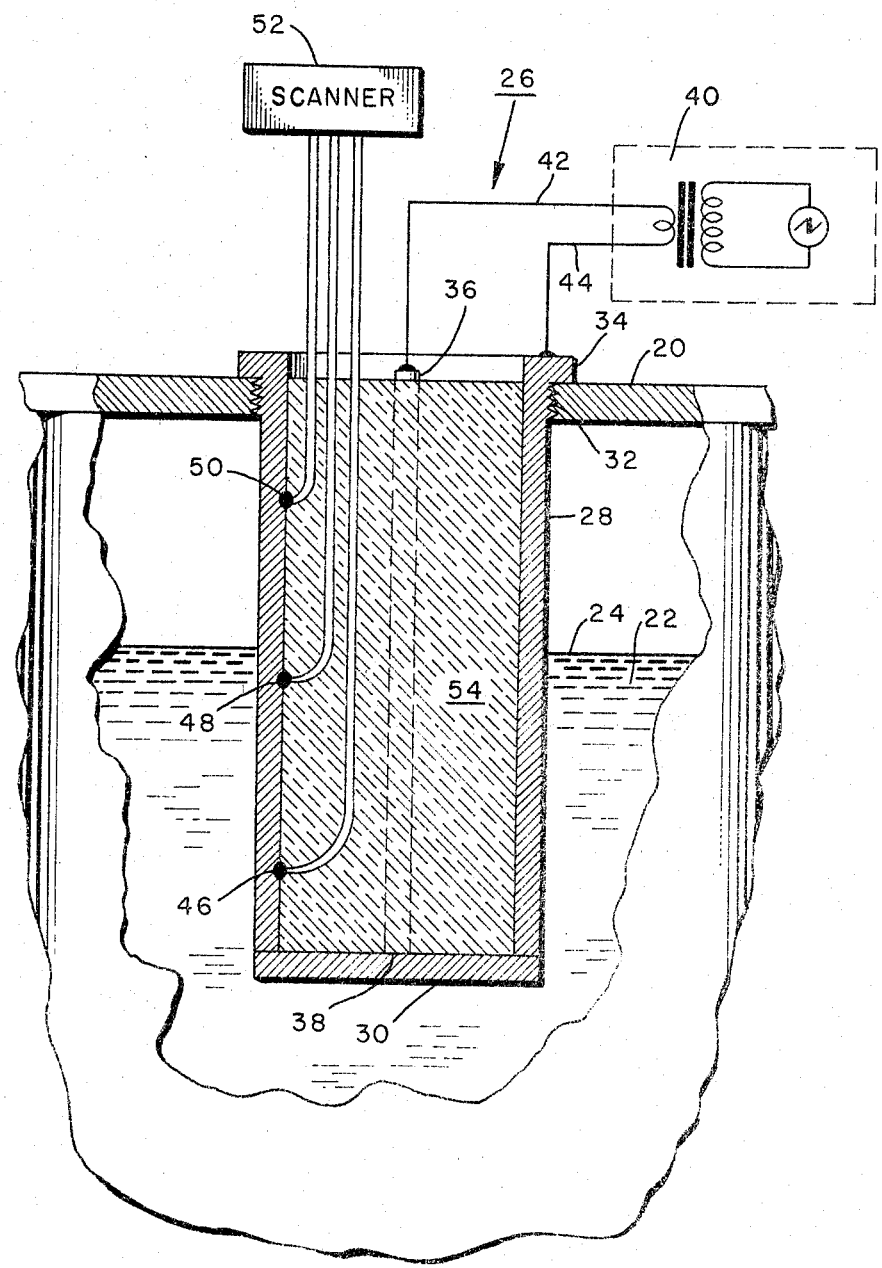
INVENTOR.
PAUL D. BARLOW
BY *Kelly O. Corley*
ATTORNEY United States Patent Office 3,279,252
Patented Oct. 18, 1966

3,279,252
LEVEL SENSING APPARATUS
Paul Desmond Barlow, Pensacola, Fla., assignor to
Monsanto Company, a corporation of Delaware
Filed Sept. 18, 1963, Ser. No. 309,772
9 Claims. (Cl. 73—295)

The present invention concerns a liquid surface sensing apparatus which detects liquid level by responding to differential heat conduction on opposite sides of the surface being monitored.

Several liquid level sensing devices are known to the prior art which provide a series of temperature sensing devices, such as thermocouples, extending through or vertically spaced along an interior vessel wall so as to be exposed to the material being monitored. These typically relied on sensing an existing temperature differential on opposite sides of the liquid surface. The sensing devices were thus exposed to possible corrosive effects of the liquid and to mechanical damage from liquid currents in certain processes. The devices were further subject to accidental mechanical damage during cleaning of the vessel, and in some cases prevented effective cleaning of the vessel since they could not be readily removed.

Accordingly, a primary object of the invention is to provide a liquid level sensing apparatus wherein the temperature sensing devices are isolated from direct contact with the liquid being sensed.

A further object is to provide a liquid level sensing apparatus which may be readily removed whereby the vessel may be readily cleaned.

A further object is to provide a liquid level sensing apparatus wherein the sensing devices are protected from mechanical damage.

A further object is to provide a liquid level sensing apparatus wherein the sensing apparatus may be readily and rapidly replaced.

A further object is to provide a liquid level sensing apparatus which does not require an existing temperature differential on opposite sides of the liquid surface.

Other objects of the invention will in part be obvious and will in part appear hereinafter.

The invention accordingly comprises the features of construction, combination of elements, and arrangements of parts which will be exemplified in the construction hereinafter set forth, and the scope of the invention will be indicated in the claims.

For a more complete understanding of the nature and objects of the invention, reference should be made to the following detailed description taken in connection with the accompanying drawing, in which the single figure is a fragmentary vertical sectional view of level sensing apparatus according to the invention.

Referring now to the figure, there is shown a portion of a top 20 of a vessel containing liquid 22, the surface 24 of which is to be monitored. The level sensing assembly 26 according to the present invention is illustrated as mounted in and extending through top 20, and extends downwardly into the liquid 22. Assembly 26 includes a conductive cylindrical housing 28 having a closed conductive bottom portion 30. Housing 28 may be attached to vessel top 20 by the illustrated screw threads 32, or it may be welded in place so as to positively seal the vessel, if desired. As illustrated, the upper end of housing 28 is provided with a radial flange 34 which engages vessel top 20 so as to limit downward movement of housing 28 and thus to positively locate housing 28 with respect to the vessel top 20. A central conductive rod 36 extends along the axis of housing 28, and is electrically and mechanically attached to bottom portion 30, as by welding at 38.

A heating current source 40 has one output conductor 42 connected to the upper end of rod 36 and its remaining output conductor 44 connected to the upper end of housing 28. It may be seen that a voltage applied to conductors 42 and 44 will produce a current flowing through rod 36 and housing 28 in series, generating heat due to the internal resistance of these elements. Advantageously housing 28 and bottom portion 30 may be of stainless steel or some similar material which has relatively high electrical resistance and which is not corroded by the environment inside the vessel, while rod 36 may be formed from a material which is an excellent electrical conductor, such as copper or aluminum. This reduces the heat developed in rod 36 and permits a more efficient utilization of the power provided by source 40.

As will be explained below, the resulting current should be large enough to cause heating of housing 28 to a temperature somewhat above the temperature of liquid 22 or the gases above liquid 22. As illustrated, source 40 may include a step-down transformer having its primary winding connected to a conventional alternating current source and its low voltage secondary attached to conductors 42 and 44.

A series of temperature sensing means, illustrated as thermocouple junctions 46, 48 and 50, is attached to the interior surface of housing 28 at vertically spaced positions spanning the anticipated range of liquid level. The pair of dissimilar conductors from which each thermocouple junction is formed lead upwardly out of housing 28 to a conventional temperature monitoring apparatus or scanner, illustrated at 52. The monitoring apparatus 52 may be of any conventional construction, and need only determine which adjacent sensing elements indicate the most marked temperature difference, to locate the liquid level.

The several thermocouple junctions may be welded to the interior surface of housing 28, or alternatively, holes may be drilled in the housing 28 at the appropriate spots, the dissimilar conductors may be inserted and the hole then welded shut to form the thermocouple junction embedded in the walls of housing 28. Advantageously the remaining space inside housing 28 may be filled with a suitable electrical and thermal insulating material 54. Insulation 54 will help prevent heat transfer due to convection, and will electrically insulate rod 36 from housing 28.

In operation, source 40 supplies heating current to heat housing 28 to a temperature somewhat above the temperature of liquid 22 and the gas within the vessel. The portion of housing 28 below surface 24 will develop a different temperature than the portion above surface 24, due to the different thermal conductivities and specific heats of the liquid 22 and the gas. Since the thermal conductivity and specific heat of liquids are usually substantially greater than for gases, the portion of housing 28 which is immersed in liquid 22 will be cooler than the portion above the liquid. The temperature sensing elements above the liquid level will be exposed to a higher temperature than those below the liquid level and will therefore produce different output signals.

Current source 40 as illustrated produces a low voltage, high current alternating current to heat housing 28. It should be understood that housing 28 may be equally well heated with other sources, such as by direct current. While the exemplary materials of stainless steel and copper or aluminum have been noted above as suitable for housing 28 and rod 36, respectively, other materials may be selected depending on the environment inside the vessel and other factors which will occur to the person skilled in the art in designing a particular installation. Similarly while thermocouples have been disclosed as the specific preferred embodiment of temperature sensing elements which are vertically spaced inside housing 28, other equivalent temperature sensing elements, such as thermistors, may be used by suitably modifying the monitoring apparatus 52. A suitable insulating material 54 may likewise be selected for the particular application involved. While only three temperature sensing elements 46, 48 and 50 have been illustrated, as many such elements may be supplied as is necessary or desirable. Although the apparatus as herein described has been disclosed as detecting the location of the interface between a liquid and a gas, the apparatus may be used with equal effectiveness in determining the location of the interface between any materials having different thermal conductivities and specific heats. An example would be to detect the interface between layers of different liquids or between a solid and a liquid or gas.

It may be seen from the above description and the accompanying drawing that the liquid level sensing apparatus according to the present invention permits the detection of a liquid surface while protecting the temperature sensing elements from contact with the liquid being sensed. This prevents possible corrosion of the elements by the liquid and avoids mechanical damage to the elements either by liquid currents or by being struck by an object within the vessel. With the preferred construction illustrated wherein housing 28 is mounted by readily detachable means such as the illustrated screw threads 32, the apparatus may be readily removed for inspection, repair or cleaning. The provision of internal generation of heat permits the detection of liquid level in a system which does not have an existing temperature differential on opposite sides of the liquid surface being monitored.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Liquid level sensing apparatus, comprising in combination:
    (a) a conductive wall defining an electrically conductive tubular member having a closed lower end,
    (b) heating means for passing an electrical current through said wall whereby said member is heated by current flowing through said wall, and
    (c) a plurality of vertically spaced temperature sensing means mounted inside said tubular member in direct contact with said wall.

2. The level sensing apparatus defined in claim 1, further comprising monitoring means for determining which adjacent sensing elements indicate the greatest temperature difference.

3. Liquid level sensing apparatus comprising in combination:
    (a) a conductive tubular member having its lower end closed,
    (b) a conductor electrically connected to said lower end and extending upwardly therefrom the entire length of said member, said conductor being insulated from said member except at the lower end thereof,
    (c) means for supplying heating current to said conductor and to the upper end of said tubular member so that current flows through said conductor and said member in series whereby said member is heated, and
    (d) a plurality of vertically spaced temperature sensing means mounted inside said tubular member in direct thermal contact with the walls thereof.

4. The level sensing apparatus defined in claim 3, further comprising monitoring means for determining which adjacent sensing elements indicate the greatest temperature difference.

5. Liquid level sensing apparatus, comprising in combination:
    (a) a wall defining a conductive tubular member having a closed lower end,
    (b) a conductor electrically connected to said lower end and extending upwardly therefrom the entire length of said member, said conductor having less electrical resistance than does said member and contacting said member only at said lower end,
    (c) means for supplying heating current to said conductor and to the upper end of said tubular member so that current flows through said conductor and said member in series whereby said member is heated, and
    (d) a plurality of vertically spaced temperature sensing means mounted inside said tubular member in direct thermal contact with vertically spaced parts of said wall.

6. The level sensing apparatus defined in claim 5 wherein said temperature sensing means are a plurality of thermocouples welded to vertically spaced points on said wall.

7. Liquid level sensing apparatus comprising in combination:
    (a) a housing formed by continuous conductive walls vertically extending from a lower end to an upper end, said housing being closed at said lower end,
    (b) a conductor connected to said lower end and extending upwardly therefrom the entire length of said housing, said conductor being insulated from said housing except at the lower end thereof,
    (c) means to supply heating current to said conductor and to the upper end of said housing so that current flows through said conductor and through said housing in series,
    (d) and a plurality of vertically spaced temperature sensing elements mounted in said housing in direct thermal contact with vertically spaced points on said walls.

8. The level sensing apparatus defined in claim 7, further comprising monitoring means for determining which adjacent sensing elements indicate the greatest temperature difference.

9. The level sensing apparatus defined in claim 7 wherein said conductor has less electrical resistance than does said member.

References Cited by the Examiner

UNITED STATES PATENTS

| | | | |
|---|---|---|---|
| 2,702,476 | 2/1955 | De Boisblanc | 73—295 |
| 2,861,159 | 11/1958 | Seney | 137—392 X |

FOREIGN PATENTS

| | | |
|---|---|---|
| 1,295,090 | 4/1962 | France. |
| 937,237 | 9/1963 | Great Britain. |

LOUIS R. PRINCE, *Primary Examiner.*

FRANK H. THOMSON, *Assistant Examiner.*